(12) United States Patent
Koskinen et al.

(10) Patent No.: US 7,168,895 B2
(45) Date of Patent: Jan. 30, 2007

(54) INDEXABLE CUTTING INSERT

(75) Inventors: Jorma Koskinen, Fagersta (SE); Kent Viol, Arboga (SE); Peter Nordstrom, Fellingsbro (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 10/907,755

(22) Filed: Apr. 14, 2005

(65) Prior Publication Data

US 2006/0045634 A1    Mar. 2, 2006

(30) Foreign Application Priority Data

Aug. 25, 2004   (SE)   .................................. 0402094

(51) Int. Cl.
   *B23C 5/22*   (2006.01)
(52) U.S. Cl. .................... 409/140; 407/48; 407/113
(58) Field of Classification Search ................ 409/140, 409/139; 407/40, 42, 48, 61, 113
   See application file for complete search history.

(56) References Cited

U.S. PATENT DOCUMENTS

| | | | |
|---|---|---|---|
| 2,930,269 A | 3/1960 | Swarts | |
| 3,299,489 A | 1/1967 | Pohle | |
| 3,341,920 A | 9/1967 | Kelm | |
| 3,341,921 A | 9/1967 | Kelm | |
| 3,525,136 A | 8/1970 | Crosby | |
| 3,629,919 A * | 12/1971 | Trevarrow, Jr. | 407/103 |
| 3,827,119 A * | 8/1974 | Bennett | 407/40 |
| 4,234,276 A | 11/1980 | Meier, Jr. | |
| 4,430,031 A | 2/1984 | Hellstrom | |
| 4,525,110 A * | 6/1985 | Stojanovski | 407/40 |
| 4,578,005 A | 3/1986 | Fuse et al. | |
| 4,610,153 A | 9/1986 | Nedorezov | |
| 4,682,916 A * | 7/1987 | Briese | 407/113 |
| 4,709,737 A | 12/1987 | Jonsson | |
| 4,727,775 A | 3/1988 | Nishiwaki | |
| 4,762,446 A | 8/1988 | Nishiwaki | |
| 4,892,448 A | 1/1990 | Hoch et al. | |
| 4,912,294 A | 3/1990 | Tsujii | |
| 4,921,377 A | 5/1990 | Hoch et al. | |
| 4,940,369 A * | 7/1990 | Aebi et al. | 407/42 |

(Continued)

FOREIGN PATENT DOCUMENTS

CH            468860         2/1969

(Continued)

OTHER PUBLICATIONS

Swedish Official Action in SE 0402094-7 and translation.

(Continued)

*Primary Examiner*—Monica Carter
*Assistant Examiner*—Sara Addisu
(74) *Attorney, Agent, or Firm*—WRB-IP LLP

(57) ABSTRACT

An indexable insert includes an insert body including a plurality of cutting edge portions and an insert hole arrangement for permitting the insert to be secured to a toolholder. The insert hole arrangement includes at least one securing screw-receiving hole. The insert hole arrangement is configured to permit a securing screw to extend through the insert body along any one of at least two different axes through the insert hole arrangement, the insert hole arrangement including a screw abutment surface for abutting against the securing screw.

28 Claims, 18 Drawing Sheets

U.S. PATENT DOCUMENTS

| | | | |
|---|---|---|---|
| 4,946,318 A * | 8/1990 | David et al. | 407/42 |
| 4,966,504 A | 10/1990 | Seme, Jr. et al. | |
| 4,966,506 A | 10/1990 | Slanker | |
| 5,236,288 A | 8/1993 | Flueckiger | |
| 5,332,342 A | 7/1994 | Kizaki et al. | |
| 5,401,127 A | 3/1995 | Nakajima et al. | |
| 5,725,340 A | 3/1998 | Nakajima et al. | |
| 5,836,723 A | 11/1998 | Von Haas et al. | |
| 5,893,683 A * | 4/1999 | Johnson | 407/42 |
| 5,915,888 A * | 6/1999 | Minicozzi | 407/54 |
| 5,993,125 A | 11/1999 | Shimada | |
| 6,000,885 A * | 12/1999 | Erickson | 407/113 |
| 6,048,140 A * | 4/2000 | Johnson | 407/42 |
| 6,050,751 A | 4/2000 | Hellstrom | |
| 6,106,203 A | 8/2000 | Asmis et al. | |
| 6,196,769 B1 | 3/2001 | Satran et al. | |
| 6,379,087 B1 | 4/2002 | Alexander | |
| 6,406,225 B1 | 6/2002 | Stojanovski | |
| 6,607,333 B2 | 8/2003 | Satran et al. | |
| 6,666,631 B2 | 12/2003 | Yajima et al. | |
| 6,672,942 B1 | 1/2004 | Ikeda et al. | |
| 6,796,750 B2 | 9/2004 | Men | |
| 6,921,233 B2 * | 7/2005 | Duerr et al. | 407/34 |
| 2003/0113175 A1 * | 6/2003 | Wermeister | 407/113 |
| 2004/0131431 A1 * | 7/2004 | Satran | 407/40 |
| 2005/0019113 A1 * | 1/2005 | Wermeister | 407/113 |

FOREIGN PATENT DOCUMENTS

| | | | |
|---|---|---|---|
| DE | 19943006 | | 3/2001 |
| EP | 1405686 | | 4/2004 |
| JP | 01092006 A | * | 4/1989 |
| JP | 2004167635 | | 5/2004 |
| SE | 346074 | | 6/1972 |

OTHER PUBLICATIONS

European Search Report from corresponding EP 0500 8738.

* cited by examiner

INDEXABLE CUTTING INSERT

The present invention relates to replaceable cutting inserts for cutting tools and, more particularly, to indexable inserts.

The useful life and/or usefulness of a cutting tool can often be improved by providing it with replaceable cutting inserts on which cutting edges for cutting a workpiece are provided. Instead of, for example, disposing of the cutting tool when a cutting edge breaks or becomes worn, the cutting insert can be replaced and the cutting tool can be used again. Also, the cutting inserts can be made of material that is better adapted to perform a cutting operation on a workpiece than the material from which the remainder of the cutting tool, often called a toolholder, is formed.

Such cutting tools with replaceable inserts are used in a variety of applications. For example, it is known to dress the opposing tips of welding electrodes using cutting tools with replaceable cutting inserts such as is disclosed in, for example, U.S. Pat. No. 5,401,127, which is incorporated by reference. This patent describes a cutting tool that uses a Y-shaped and/or triangular cutting inserts arranged around a central opening through which the axis of rotation of the cutting tool passes to simultaneously dress a top and a bottom electrode extending into the central opening from opposite ends of the central opening. Though the inserts in the cutting tool are replaceable, they are usable in only a single orientation relative to the cutting tool and the costs of operating the tool may be high.

Certain replaceable cutting inserts are indexable, i.e., can be oriented in plural different ways on the cutting tool to expose one or more of plural useable cutting edges to a workpiece. Many cutting tools, however, do not readily lend themselves to being provided with an indexable cutting insert. The cutting inserts used in U.S. Pat. No. 5,401,127, for example, cannot be indexed.

A common technique of securing an indexable cutting insert to a toolholder is to use a screw that passes through a hole in a central region of the cutting insert and has threads that engage with threads in a hole formed in a pocket for the insert in the toolholder. The insert is typically indexed to one of two or more positions by being rotated around the screw. In some toolholders, however, it is difficult to provide a suitable threaded hole in the pocket of the toolholder. For example, it may be necessary to form the pocket on a relatively thin or fragile portion of the toolholder, and providing the threaded hole risks damage to the toolholder or insufficient support for the insert.

In accordance with an aspect of the present invention, an indexable insert includes an insert body including a plurality of cutting edge portions and an insert hole arrangement for permitting the insert to be secured to a toolholder. The insert hole arrangement includes at least one securing screw-receiving hole. The insert hole arrangement is configured to permit a securing screw to extend through the insert body along any one of at least two different axes through the insert hole arrangement, the insert hole arrangement including a screw abutment surface for abutting against the securing screw.

In accordance with another aspect of the present invention, a set of indexable inserts includes at least one first insert and at least one second insert usable together on a common toolholder. Each of the first insert and the second insert include an insert body including a plurality of cutting edge portions and an insert hole arrangement for permitting the insert body to be secured to a toolholder, the insert hole arrangement including at least one securing screw-receiving hole, the insert hole arrangement being configured to permit a securing screw to extend through the insert body along any one of at least two different axes through the insert hole arrangement. The cutting edge portions of the first insert are different from the cutting edge portions of the second insert.

In accordance with another aspect of the present invention, an indexable insert includes an insert body including a top surface including a top clearance surface, a bottom surface including a bottom clearance surface, and a side rake surface extending between the top surface and the bottom surface. A top intersection between the side rake surface and the top surface defines at least two top cutting edge portions and a bottom intersection between the side rake surface and the bottom surface defines at least two bottom cutting edge portions. A length of the top intersection and a length of the bottom intersection are each greater than a distance between the top intersection and the bottom intersection.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

An embodiment of a tool 21 for dressing electrode tips is shown in FIGS. 1A–1E. The present invention is not limited to tools for dressing electrode tips. However, for purposes of discussion the present invention will generally be described in connection with a tool for dressing electrode tips.

Figure 1A:
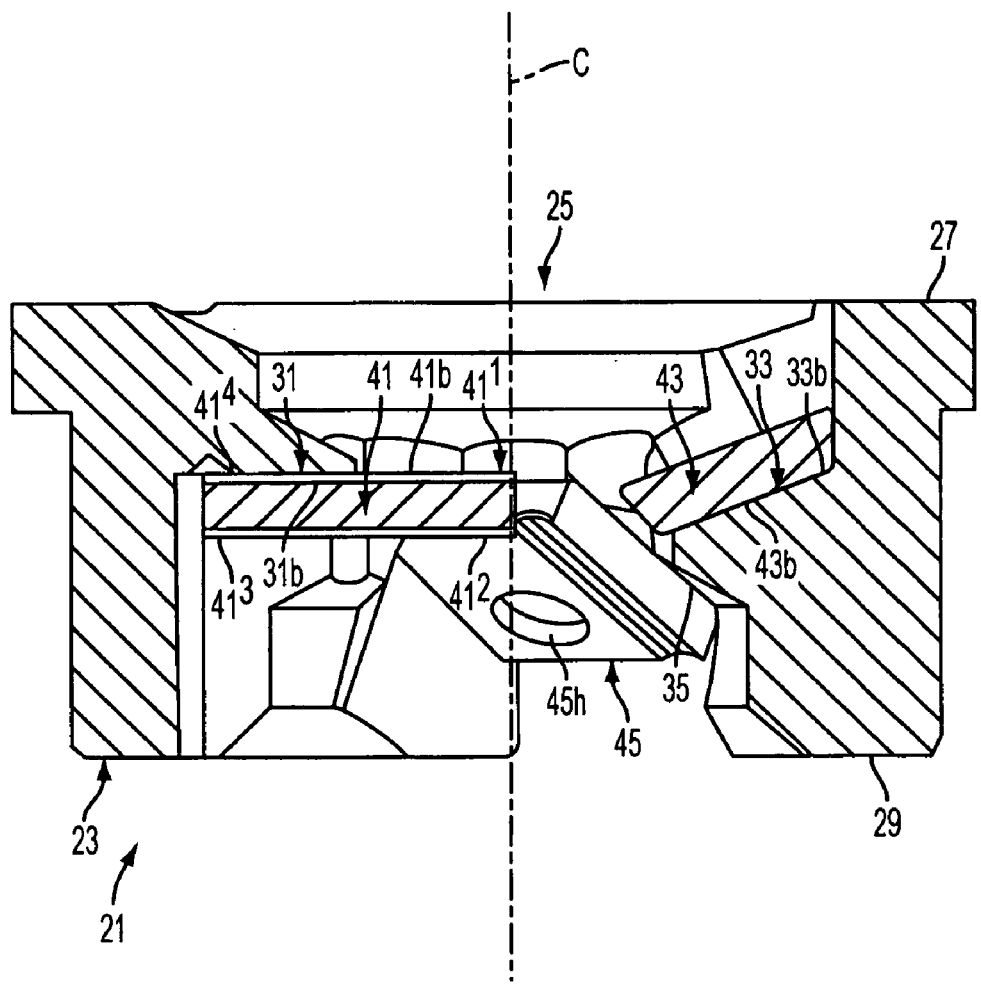
FIGS. 1A–1E are side cross-sectional, top perspective, bottom perspective, bottom plan, and top plan views of a cutting tool according to an embodiment of the present invention.
Figure 1B:
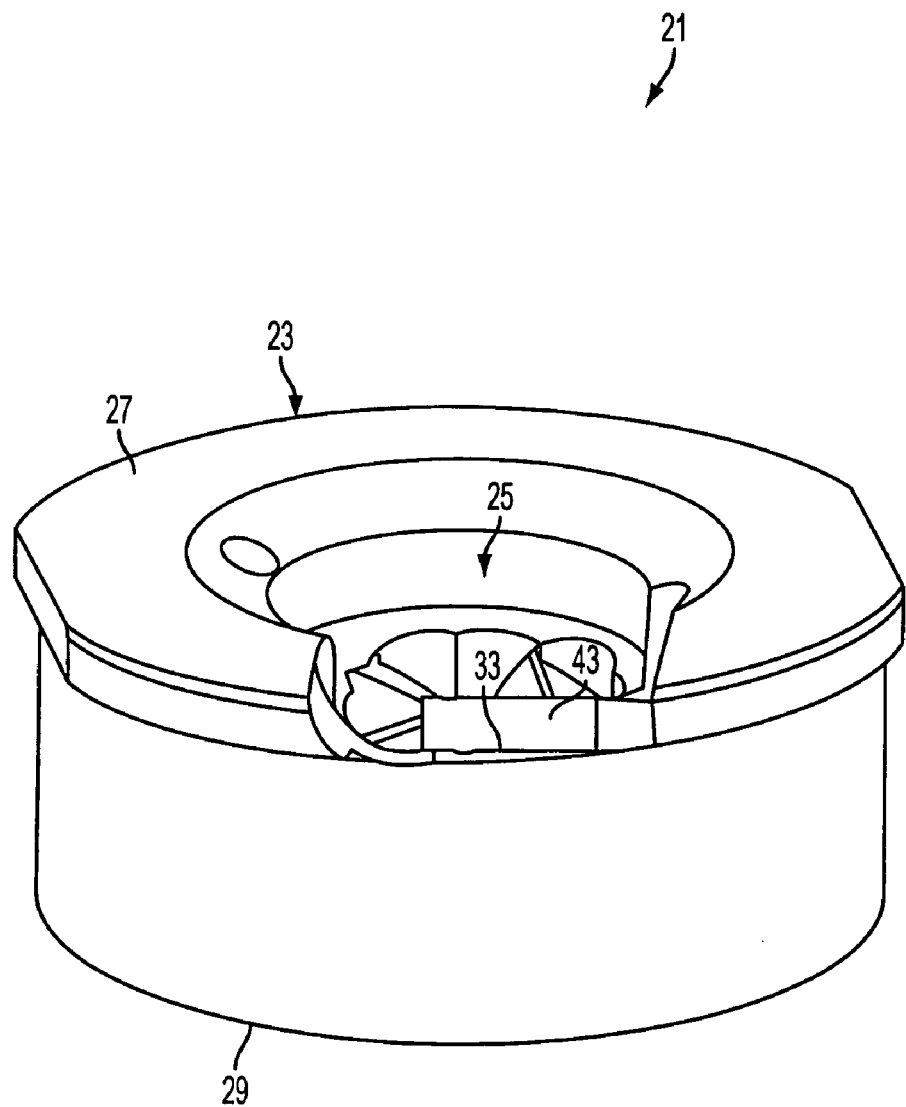
Figure 1C:
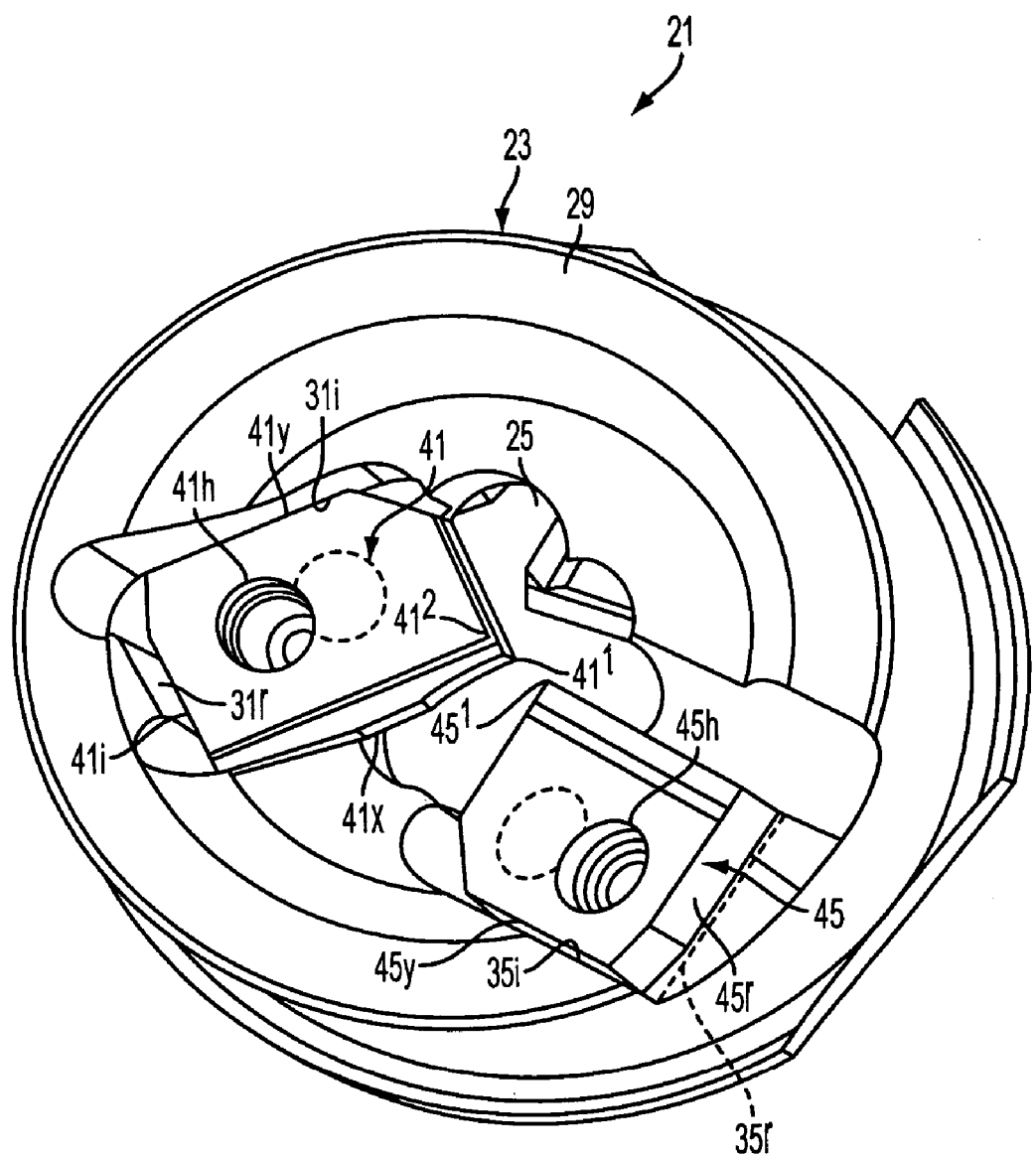

As seen in FIG. 1A, the tool 21 includes a toolholder 23 having an opening 25 extending through the toolholder from a top 27 of the toolholder to a bottom 29 of the toolholder along a central axis C of the toolholder. A plurality of insert mounting pockets are disposed around the opening 25 for mounting replaceable cutting inserts. The plurality of insert mounting pockets include a center pocket 31, a top pocket 33, and a bottom pocket 35.

If desired, depending upon the application, fewer or more insert mounting pockets and inserts therefor may be provided. Some types of tools, such as turning, boring, drilling, or milling tools, may have only one insert mounting pocket for mounting a single insert, while other versions of such tools may have dozens or hundreds of insert mounting pockets.

The tool 21 also includes a center insert 41 disposed in the center pocket 31, a top chamfer 43 insert disposed in the top pocket 33, and a bottom chamfer insert 45 disposed in the bottom pocket 35. When a top electrode tip and a bottom electrode tip (shown in phantom in FIGS. 6A–6B) are disposed in a dressing position relative to a top and a bottom of the opening 25 in the toolholder and the tool 21 is rotated, the center insert 41 and the top chamfer insert 43 dress the top electrode tip, and the center insert 41 and the bottom chamfer insert 45 dress the bottom electrode tip.

As seen in FIGS. 2A–2F and 3A–3F, the inserts 41, 43, and 45 may have a plurality of cutting edge portions. It is desirable that the top chamfer insert 43 and the bottom chamfer insert 45 be identical and the illustrations of the top chamfer insert in FIGS. 3A–3F and the corresponding description shall be understood to apply to the bottom chamfer insert, as well, except where otherwise noted. For the inserts 41, 43, and 45, designations of "left" and "right" are substantially arbitrary and for purposes of discussion as the inserts will ordinarily be formed to be indexable such that left can become right and vice versa.

Cutting edge portions are defined for purposes of the present application as portions of a cutting edge that are intended to be exposed to and contact a workpiece such as an electrode tip. Exposed, in the sense used here, means that the cutting edge portion is in a position where it is adapted to contact a workpiece, instead of merely being visible but not adapted to contact a workpiece in any meaningful fashion. A cutting edge portion may comprise all or, more typically, part of a cutting edge.

It is desirable that at least one of the center insert 41, the top chamfer insert 43, and the bottom chamfer insert 45 is indexable to permit at least one of two or more cutting edge portions to be exposed. Ordinarily, all of the inserts will be indexable to multiple positions to permit multiple cutting edge portions to be exposed. In this way, it is not necessary to dispose of a cutting insert every time a cutting edge portion is worn or broken. If the cutting edge portion is worn or broken, the insert can simply be indexed to expose a different cutting edge portion.

Figure 1D:
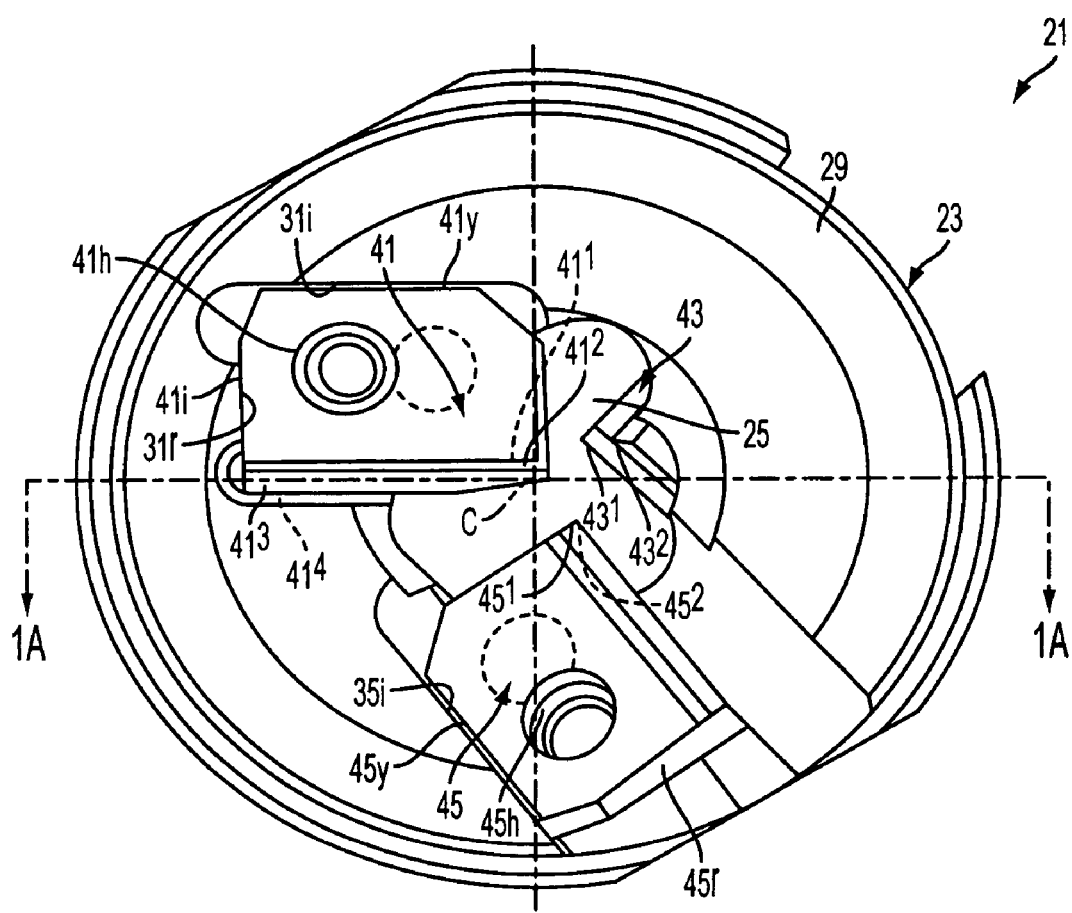
Figure 1E:
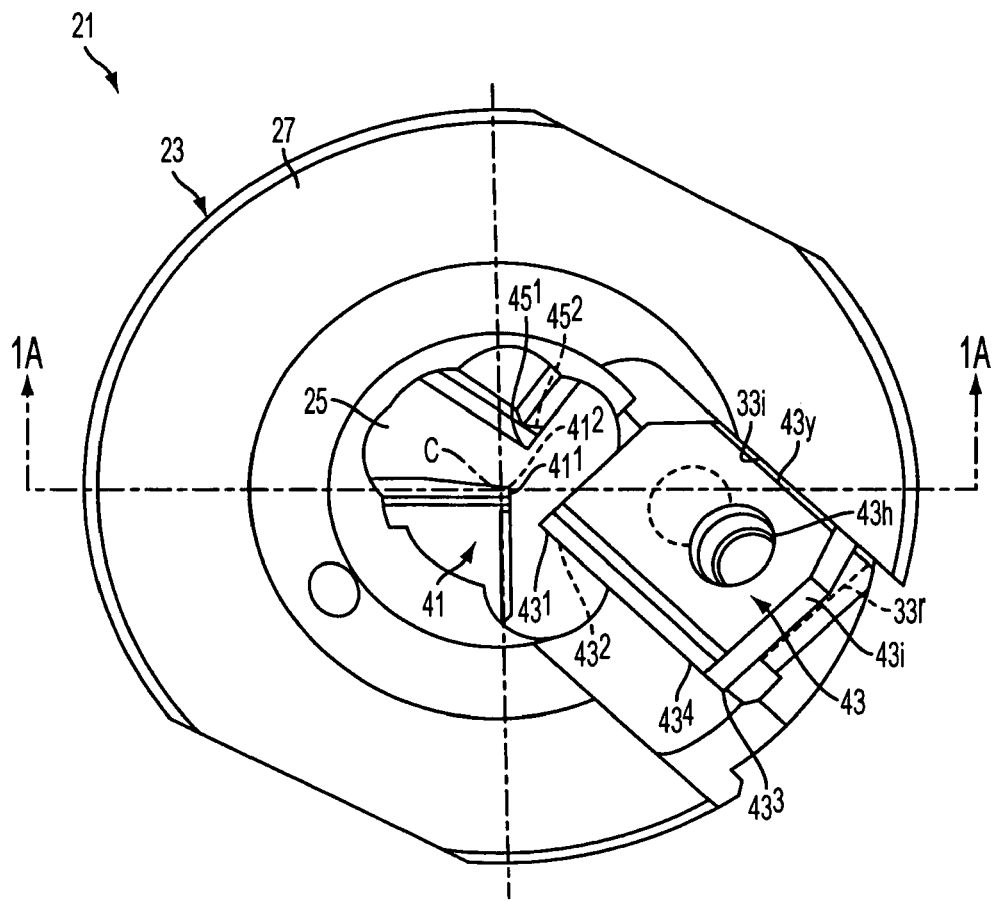
Figure 2A:
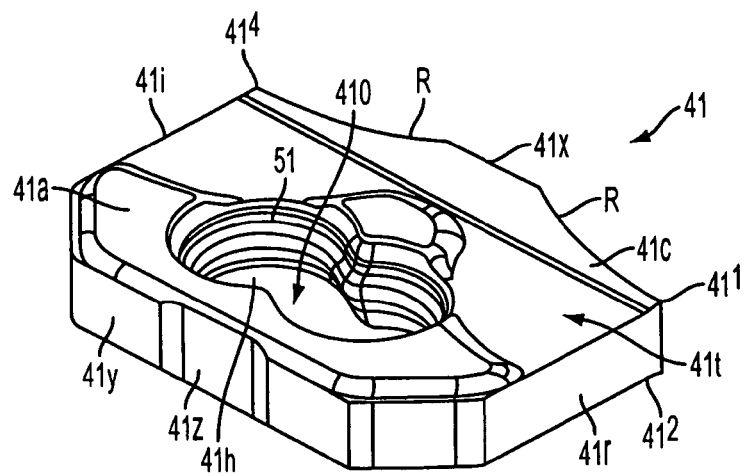
FIGS. 2A–2F are top, rear perspective, bottom rear perspective, top plan, side cross-sectional, bottom plan, and side plan views of a cutting insert according to an embodiment of the present invention.
Figure 2B:
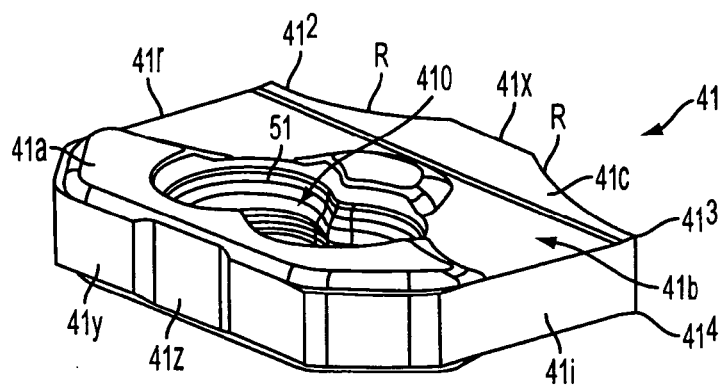
Figure 2F:
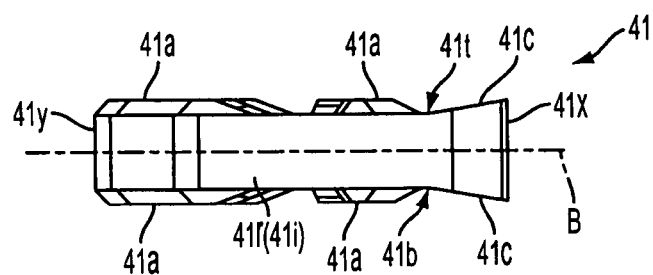
Figure 2C:
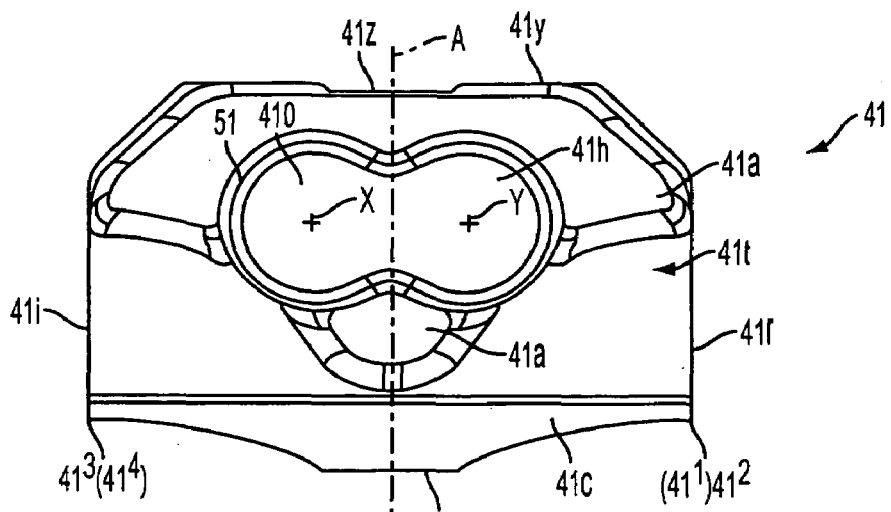
Figure 2D:
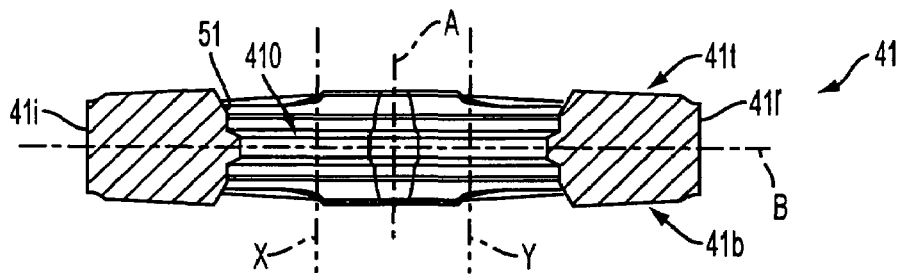
Figure 2E:
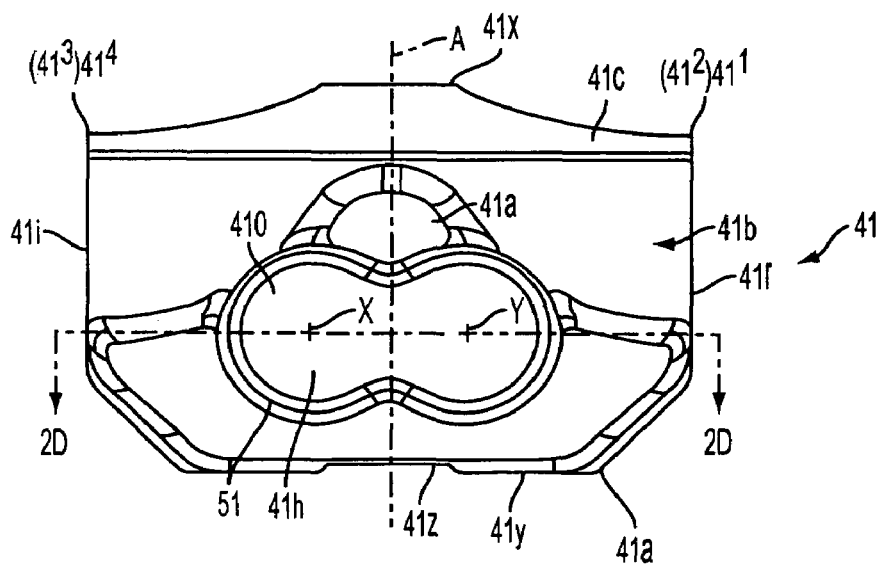
Figure 3A:
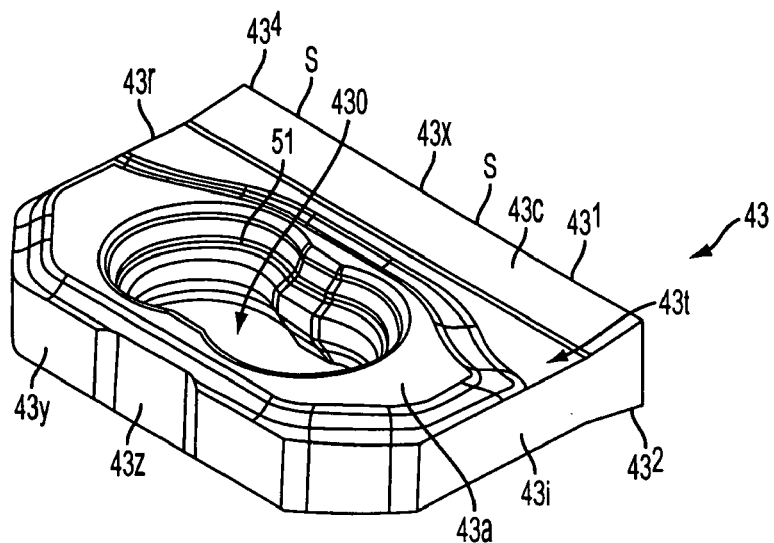
FIGS. 3A–3F are top, rear perspective, bottom rear perspective, top plan, side cross-sectional, bottom plan, and side plan views of a cutting insert according to another embodiment of the present invention.
Figure 3B:
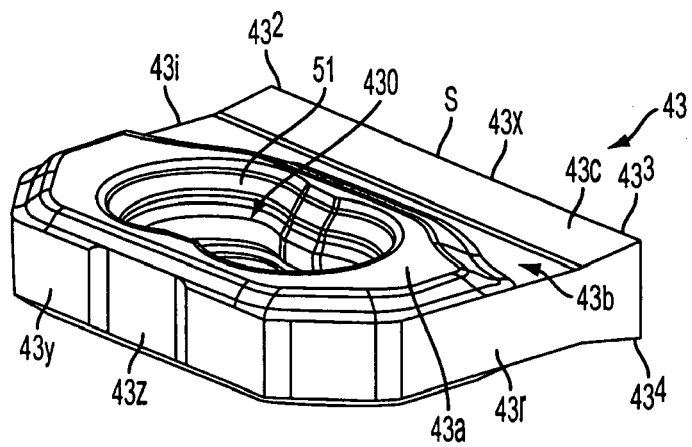
Figure 3F:
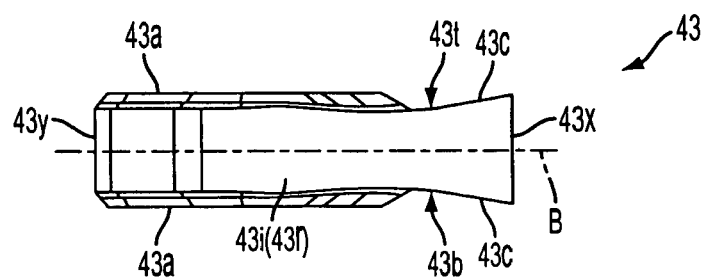
Figure 3C:
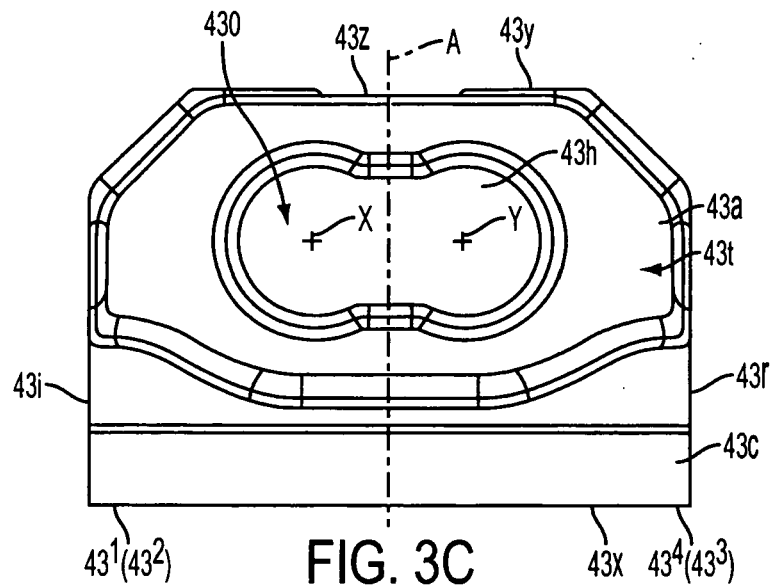
Figure 3D:
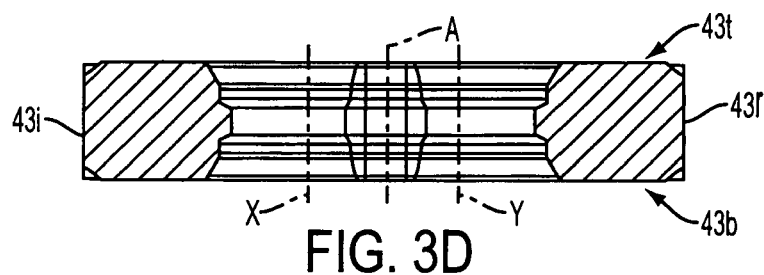
Figure 3E:
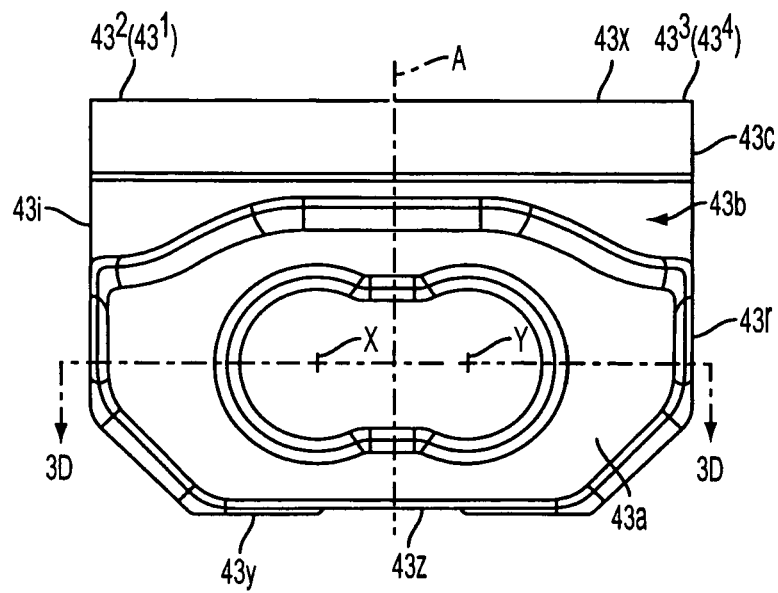

For example, as seen in FIG. 1A, in the tool 21, at any given time, two cutting edge portions $41^1$ and $41^2$ of the center insert 41 are exposed, one portion $41^1$ being closer to a top of the opening 25 and one portion $41^2$ being closer to the bottom of the opening, and two cutting edge portions $41^3$ and $41^4$ are not exposed. As seen in FIGS. 1D and 1E, corners of the center insert by the exposed cutting edge portions can be disposed at or near the central axis C of the toolholder 23.

By turning the center insert 41 through 180°, the two cutting edge portions $41^1$ and $41^2$ that were exposed are moved to a position where they are not exposed, and the two cutting edge portions $41^3$ and $41^4$ that were not exposed are moved to a position where they are exposed. Thus, the center insert 41 is indexable to two different positions to expose four cutting edge portions $41^1$, $41^2$, $41^3$, and $41^4$. In the tool 21, at least one, ordinarily two, of the cutting edge portions $41^1$, $41^2$, $41^3$, and $41^4$ of the center insert is disposed at or near a center axis C of the opening.

Also, in the tool 21, at any given time, one cutting edge portion of the top chamfer insert 43 and one cutting edge portion of the bottom chamfer insert 45 is exposed. Corners of the top chamfer insert 43 and the bottom chamfer insert 45 by the exposed cutting edge portions can be disposed at approximately the same radius from the central axis C of the toolholder 23, albeit usually at different radial positions, and at approximately the same axial positions as ends of the exposed cutting edge portions of the center insert 41. In this way, when the toolholder rotates relative to electrode tips, the exposed cutting edge portions of the top and bottom inserts and the center insert do not fail to contact any portion of the electrode tips that one desires to dress. It may, in fact, be desirable for there to be some overlap of the rotational paths of the cutting edge portions of the various inserts when the toolholder rotates 23 to ensure that each electrode tip is entirely dressed.

The top chamfer insert 43 and the bottom chamfer insert 45 may each be indexable to four different positions to expose four different cutting edge portions, such as the cutting edge portions $43^1$, $43^2$, $43^3$, and $43^4$ for the top chamfer insert. In the tool 21, the top chamfer insert 43 and the bottom chamfer insert 45 can be identical and, in two of the index positions for the top chamfer insert and the bottom chamfer insert, the top chamfer insert and the bottom chamfer insert are seated in the top pocket 31 and the bottom pocket 45, respectively, while, in the other two index positions, the top chamfer insert and the bottom chamfer insert are seated in the bottom pocket and the top pocket respectively, i.e., the top insert becomes the bottom insert and vice versa. The number of index positions to which a particular insert is indexable and the number of cutting edge portions of an insert that are adapted to be exposed will, of course, depend upon the insert and the toolholder.

Figure 4A:
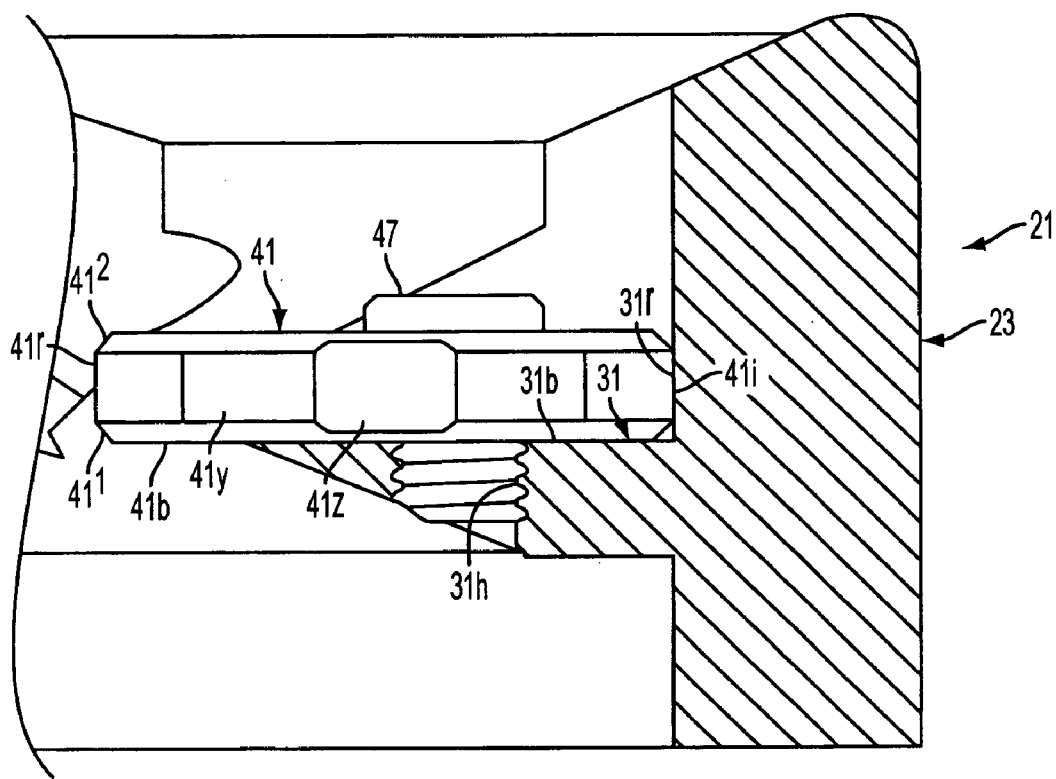
FIGS. 4A–4B are, respectively, a side cross-sectional and a broken perspective view of a portion of a cutting tool according to an embodiment of the present invention.
Figure 4B:
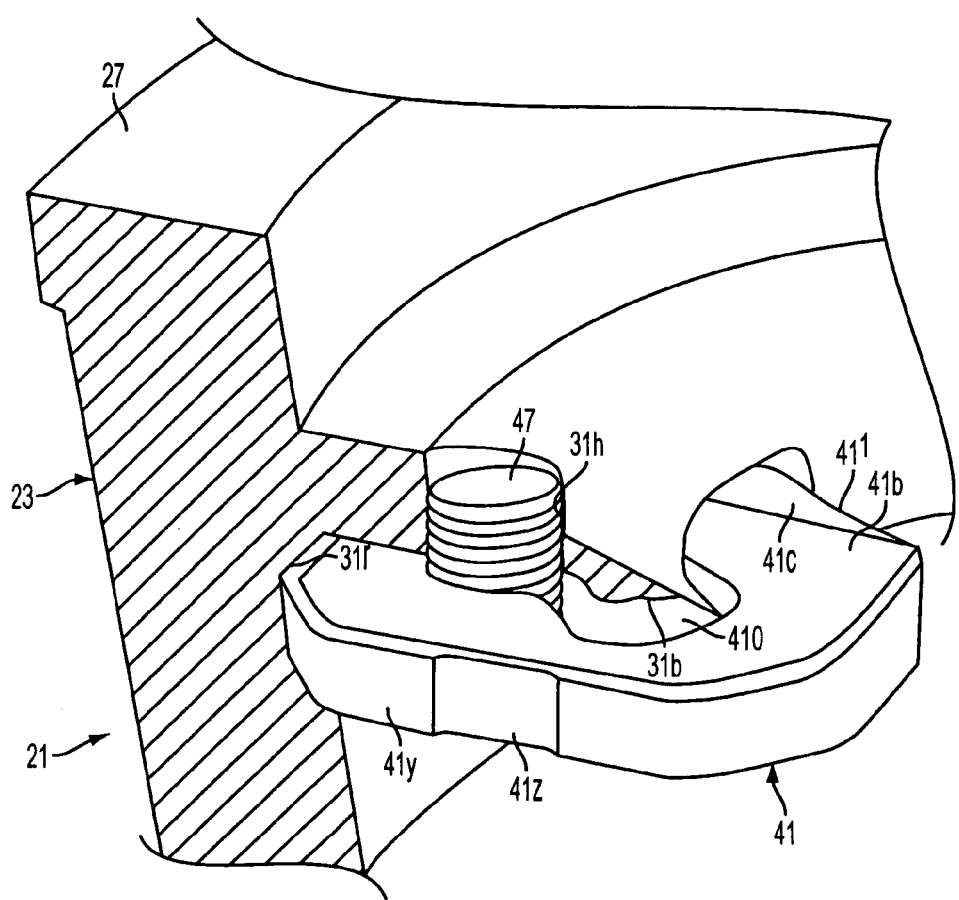

With reference to FIGS. 2A–2F, the center insert 41 may include what shall be denominated for purposes of discussion a top surface 41$t$, a bottom surface 41$b$, a right surface 41$r$, a left surface 41l, a front surface 41$x$, and a rear surface 41$y$ As seen in FIGS. 4A–4B, in the tool 21, the center pocket 31 includes a bottom supporting surface 31$b$ and a left side supporting surface 31l (FIG. 1C–1D) and a right side supporting surface 31$r$. Supporting surface portions of the center insert 41 are supported against the bottom surface 31$b$ and the two side (or left and right) supporting surfaces 31l and 31$r$. More specifically, in the illustrated embodiment, when the center insert 41 is oriented so that the cutting edge portions $41^1$ and $41^2$ are exposed, a supporting surface portion of the bottom surface 41$b$ abuts the bottom surface 31$b$, a supporting surface portion of the rear surface 41$y$ abuts the left surface 31l (FIGS. 1C–1D), and a supporting surface portion of the left surface 41l abuts the right supporting surface 31$r$. When the center insert is oriented so that the cutting edge portions $41^3$ and $41^4$ are exposed, a supporting surface portion of the top (now bottom) surface 41$t$ will abut the bottom surface 31$b$, a supporting surface portion of the rear surface 41$y$ will abut the left surface 31l, and a supporting surface portion of the right surface 41$r$ will abut the right supporting surface 31$r$.

As seen in FIGS. 3A–3F, the top chamfer insert 43 may also have a top surface 43$t$, bottom surface 43$b$, right surface 43$r$, left surface 43l, front surface 43$x$, and rear surface 43$y$. As seen in FIGS. 1A–1E the top pocket 33 and the bottom pocket 35 may also have respective bottom supporting surfaces 33$b$ and 35$b$, left supporting surfaces 33l and 35l, and, if provided right supporting surfaces. Ordinarily, a right supporting surface, if provided, would be perpendicular to the left supporting surface like the right supporting surfaces 35r and 33r shown in phantom in FIGS. 1E and 1C, respectively. The right supporting surfaces may be omitted as shown in FIGS. 1B–1E, as may be desirable, for example, to facilitate machining of the toolholder 23, and other surfaces discussed here may also be omitted.

Omission of the right supporting surfaces for the pockets 33 and 35 in the tool 21 should not have substantially deleterious, if any, effect on the dressing of the electrode tips. For example, if the chamfer inserts 43 and 45 are properly seated against the left supporting surfaces 33l and 35l and if the chamfer inserts have straight cutting edges, they will form the same chamfer shape on the electrode tips regardless whether their positions relative to the toolholder 23 differ slightly along a direction of the left supporting surfaces 33l and 35l. Stated differently, it may be permissible for the chamfer inserts 43 and 45 to shift somewhat along a direction of the left supporting surfaces 33l and 35l.

When the top chamfer insert 43 is mounted in the top pocket 33 so that the cutting edge portion $43^1$ is exposed as seen in FIG. 1E, the bottom surface 43b of the top chamfer insert abuts the bottom supporting surface 33b of the top pocket as seen in FIG. 1A, the rear surface 43y of the top chamfer insert abuts the left supporting surface 33l of the top pocket as seen in FIG. 1E, and, if a right supporting surface 33r of the top pocket is provided, the left surface 43l of the top chamfer insert abuts the right supporting surface of the top pocket. When the top chamfer insert 43 is indexed in the top pocket 33 to expose the cutting edge portion $43^3$, the top surface 43t of the top chamfer insert will abut the bottom supporting surface 33b of the top pocket, the rear surface 43y of the top chamfer insert will abut the left supporting surface 33l of the top pocket, and the right surface 43r of the top chamfer insert will abut the right supporting surface 33r, if provided, of the top pocket.

The top chamfer insert 43 may still further be indexed to expose either of the cutting edge portions $43^2$ and $43^4$. However, in this case, the top chamfer insert 43 can be indexed to expose the cutting edge portions $43^2$ and $43^4$ by mounting the top chamfer insert in the bottom pocket 35. For example, to expose the cutting edge portion $43^2$, the top (now bottom) surface 43t of the top chamfer insert will abut the bottom supporting surface 35b of the bottom pocket, the rear surface 43y of the top chamfer insert will abut the left supporting surface 35l of the bottom pocket, and the left surface 43l of the top chamfer insert will abut the right supporting surface 35r (if provided) of the bottom pocket. If the top chamfer insert 43 is indexed in the bottom pocket 35 to expose the cutting edge portion $43^4$, the bottom surface 43b of the top chamfer insert will abut the bottom supporting surface 35b of the bottom pocket, the rear surface 43y of the top chamfer insert will abut the left supporting surface 35l of the bottom pocket, and the right surface 43r of the top chamfer insert will abut the right supporting surface 35r (if provided) of the bottom pocket.

In the embodiment described here, the bottom supporting surface 31b of the center pocket 31 may be perpendicular to the central axis C of the opening 25 of the toolholder 23 and the left and right supporting surfaces 31l and 31r may be parallel to the central axis of the opening of the toolholder, i.e., perpendicular to the bottom supporting surface 31b. The bottom surfaces 33b and 35b of the top and bottom pockets may be disposed at non-zero angles relative to the central axis C, ordinarily corresponding to, or bearing a relationship to, the angle at which it is desired to form a chamfer on the electrodes. The left and right supporting surfaces 33l and 35l and 33r and 35r are ordinarily perpendicular to the bottom supporting surfaces 33b and 35b of the top and bottom pocket 33 and 35, respectively. The bottom supporting surface 31b of the center pocket 31, the bottom supporting surface 33b of the top pocket 33, and the bottom supporting surface 35b of the bottom pocket 35 ordinarily lie in planes disposed at non-zero angles relative to one another.

The opening 25 permits chips from the electrode tips being dressed to fall away from the electrodes. It also permits the center insert 41 to perform a dressing operation on both a top and a bottom electrode tip at the same time. The center insert 41, the top chamfer insert 43, and the bottom chamfer insert 45 can all be secured in the various pockets 31, 33, and 35 of the toolholder 23 by means such as securing screws 47 (FIGS. 4A–4B) that extend through through holes 41h (FIGS. 1C and 1D), 43h (FIG. 1E), and 45h (FIGS. 1A, 1C, and 1D) in the inserts into internally threaded holes in the bottom surfaces of the pockets of the toolholder such as the threaded hole 31h seen in FIGS. 4A–4B.

It is desirable that the internally threaded holes, e.g., hole 31h, be provided in relatively thick portions of the toolholder 23 so that a sufficient number and length of the threads on the securing screws 47 will engage with internal threads in the holes to provide good support for the inserts 41, 43, and 45 relative to the pockets 31, 33, and 35. In many conventional inserts, a central axis of a through hole for receiving a securing screw is at a geometrical center of the insert and the insert is at least rotationally symmetrical and/or has reflection symmetry about the axis. If desired, the holes 41h, 43h, and 45h can each have an axis disposed along a line of rotational or reflective symmetry.

It has been found to be desirable, for the inserts 41, 43, and 45 in the embodiment of the tool shown in FIGS. 1A–1E and 4A–4B, to offset the axis of the holes 41h, 43h, and 45h relative to a line of reflective symmetry, such as the line of reflective symmetry A in FIGS. 2C–2E and 3C–3D. As seen with reference to FIGS. 1A–1E and 4A–4B, it may be desirable to form the pockets 31, 33, and 35 in a ring-shaped portion of the toolholder 23 surrounding the opening 25. The ring-shaped portion of the toolholder 23, in cross-section, is substantially triangular or in the form of a truncated triangle, with a corner of the triangle facing the central axis C of the opening 25. The ring-shaped portion may generally correspond to or bear a relationship to part of the desired shape of an electrode tip to be dressed, e.g., the chamfered portion surrounding a radiused tip. Bottom surfaces 33b and 35b of the top and bottom pockets 33 and 35 may lie in planes defining the same or substantially the same angle with the central axis as the sides of the triangle.

The thickness of the ring-shaped portion of the toolholder 23 decreases toward the central axis C of the opening. It may, therefore, be desirable to offset the axis of the holes 41h, 43h, and 45h relative to the line of reflective symmetry because, when the inserts 41, 43, and 45 are mounted relative to the pockets 31, 33, and 35, the holes 41h, 43h, and 45h can align with holes in the toolholder 23 e.g., hole 31h (FIGS. 4A–4B), formed in portions of the toolholder that are thicker, i.e., further from the tip of the triangle. This may permit more threads of the securing screws 47 to engage with threads in the holes in the toolholder than if the holes 41h, 43h, and 45h were located along a line of reflective symmetry.

It has also been found to be desirable to form the holes 41h, 43h, and 45h as elongated or plural holes, or what shall be referred to here as a hole arrangement, so that, when the inserts 41, 43, and 45 are indexed, an axis of a securing screw can pass through the inserts along what shall be referred to here as different axes X and Y of the hole arrangements. As seen in, for example, FIGS. 2C–2E and 3C–3E for the center insert 41 and the top chamfer insert 43, respectively, the hole arrangements 410 and 430, respectively, can be formed as, for example, substantially "figure 8" shapes so that the securing screw 47 (FIGS. 4A–4B) can pass through the holes along either of two axes X and Y. As noted above, the description of the top chamfer insert 43 can be the same as the description of the bottom chamfer insert 45 and a separate description of the bottom chamfer insert is therefore not provided.

Figure 7A:
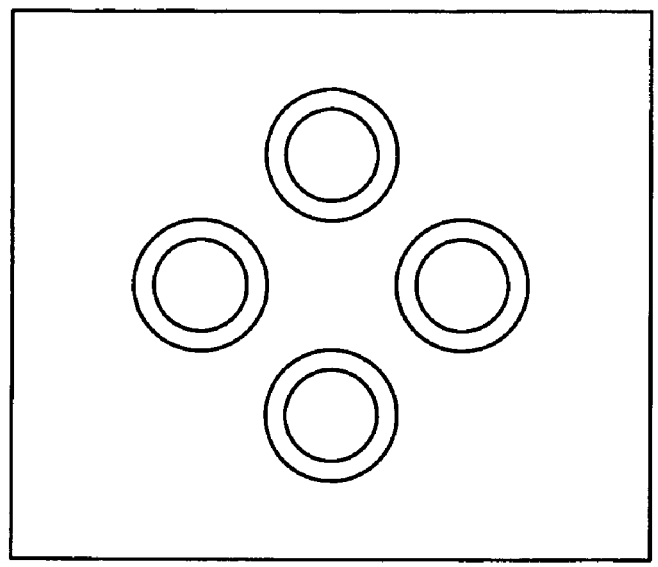
FIGS. 7A–7C are top views of inserts according to embodiments of the present invention.
Figure 7B:
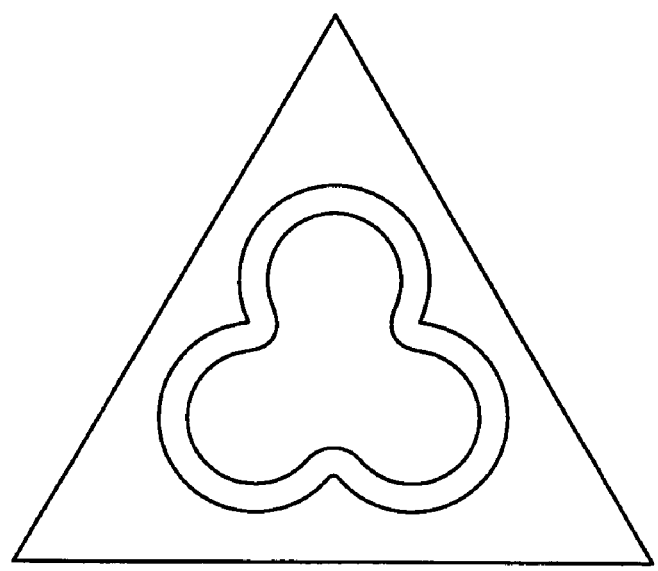
Figure 7C:
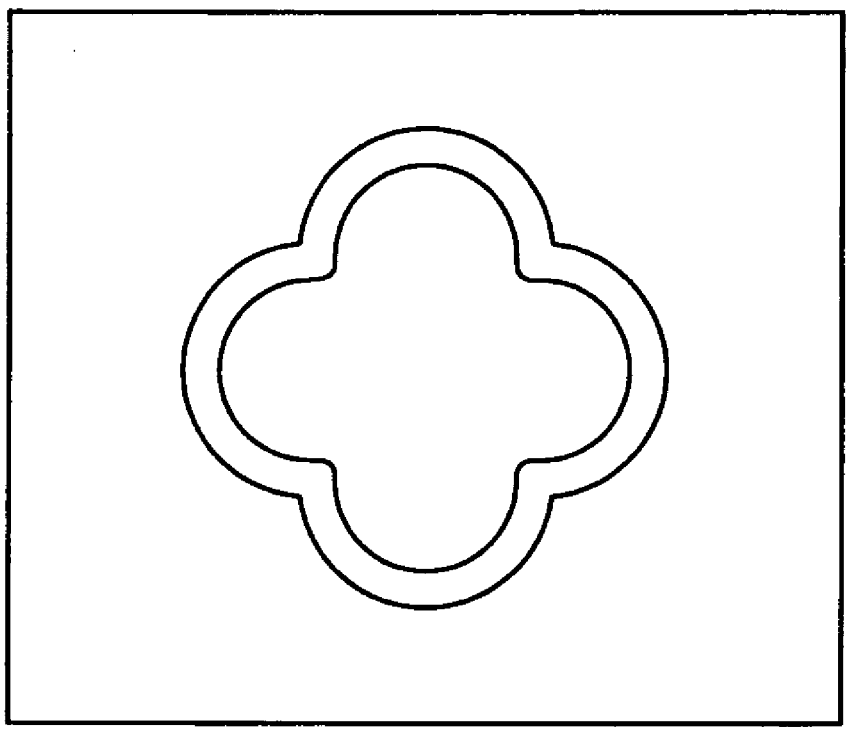

The hole arrangements 410 and 430 may be in a variety of suitable shapes. For example, the hole arrangements may simply be elongated, i.e., oval, so that the axis of a screw can pass through a hole at a plurality of different hole axes. Also, instead of having a single hole, the hole arrangements may be made up of a plurality of discrete holes as seen in FIG. 7A so that the axis of the screw can pass through the insert along a plurality of different hole axes. The hole arrangements can be formed, as well, in shapes such as "tri-star" shapes as seen in FIG. 7B and "X" shapes as seen in FIG. 7C, which may be appropriate depending upon factors such as the number of ways that the insert can be indexed. For example, an insert with a tri-star shaped hole arrangement might be indexed three ways, six ways, or some other multiple of three, an insert with an X-shaped hole arrangement might be indexed four ways, eight ways, or some other multiple of four. For example, if the insert of FIG. 7C were octagonal instead of square, it may be possible to index the insert to sixteen (or more) different positions.

Figure 5:
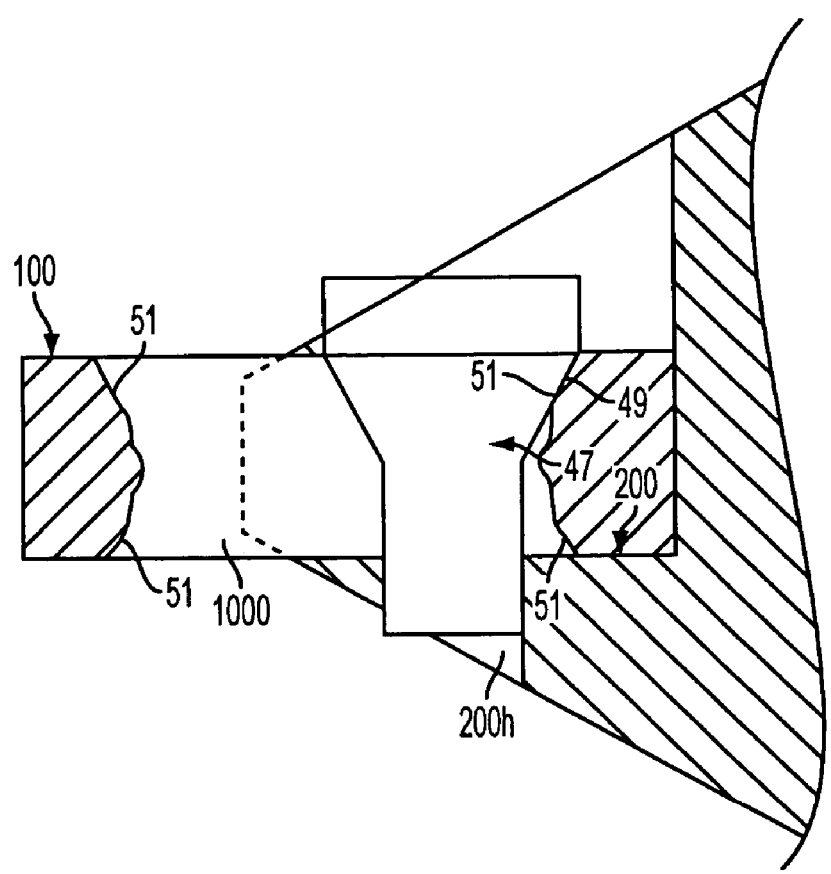
FIG. 5 is a side cross-sectional view of a cutting tool according to an embodiment of the present invention.

Whatever the shape of the hole arrangements 410 and 430 is when viewed in a direction of the axis or axes through the hole arrangements, the hole arrangements may be formed to be narrower toward a center of the inserts 41, 43, and 45 along the axes through the hole arrangements, i.e., viewing the insert in cross-section, so that the hole arrangements taper from wider openings at the top and bottom of the insert to relatively narrower "waists" at the center. FIG. 5 shows an illustrative insert 100 in cross-section. The securing screws 47 can have a shape whereby the screws gradually taper up in diameter at some point close to the head of the screw.

The hole arrangements 1000 in the inserts 100 and the holes 200h in the pocket 200 can be positioned relative to one another when the inserts are disposed in the pockets so that, as a screw 47 is tightened in the threaded hole, the tapered portion of the screw—an insert abutment surface 49 of the screw 47—will tend to contact a tapered surface—a screw abutment surface 51—of a hole arrangement and force the rear and left or right surfaces of the insert against the left and right surfaces of the pocket as the top or bottom surfaces of the insert are driven against the bottom supporting surface of the pocket.

As seen in FIGS. 2A–2C, 2E, 3A–3C, and 3E, the rear surfaces 41$y$ and 43$y$ of the inserts 41 and 43 (and 45) can be divided into plural insert supporting surface portions by recesses 41$z$ and 43$z$. The recesses provide at least two benefits. One benefit is that a smaller portion of the rear surface of an insert, i.e., the portion not including the recess, needs to meet precise dimensional tolerances desired in cutting inserts.

Another benefit is that the provision of the recess facilitates precisely and stably mounting the inserts relative to their pockets by ensuring desirable three-point contact between an insert and its pocket. In the case, for example, of a center insert 41, three point contact is ordinarily achieved through contact between a point on the bottom 41$b$ (or top 41$t$) of the insert and the bottom 31$b$ of the pocket 31, a point on the rear surface 41$y$ and the left surface 31$l$ of the pocket, and a point on the right surface 41$r$ (or left surface 41$l$) of the insert and the right surface 31$r$ of the pocket. In the case of a top insert 43 (or bottom insert 45) to be mounted in a top or bottom pocket 33 or 35 having no right surface, three point contact can be achieved by contact between two points on the rear surface 43$y$ on opposite sides of the recess 43$z$ and the left surface 33$l$ or 35$l$ of the pocket, and contact between the bottom 43$b$ (or top 43$t$) of the insert and the bottom 33$b$ or 35$b$ of the pocket.

With reference generally to FIGS. 2A–2F and 3A–3F, the inserts 41, 43, and 45 are ordinarily symmetrical about at least one axis A and the insert hole arrangements 410 and 430 are ordinarily configured such that at least two of the at least two different axes X and Y are offset from the at least one axis of symmetry. More particularly, the inserts 41, 43, and 45 can be symmetrical about a plane A parallel to an axis of the insert hole arrangement 410 and 430. The inserts 41, 43, and 45 can also, or alternatively, be symmetrical about a plane B perpendicular to an axis of the insert hole arrangement 410 and 430. Other inserts can have rotational symmetry about a central axis of a hole arrangement.

The top and bottom chamfer inserts 43 and 45 can be, but are not necessarily, identical and interchangeable. The top and bottom chamfer inserts 43 and 45 can include cutting edge portions, e.g., portions $43^1$, $43^2$, $43^3$, and $43^4$ for top chamfer insert 43, that have straight portions S (FIGS. 3A–3B) to chamfer an electrode tip so that at least a portion of the electrode tip has a constant cone angle. The center insert 41 is ordinarily, but not necessarily, different than the top and bottom chamfer inserts 43 and 45. The cutting edge portions $41^1$, $41^2$, $41^3$, and $41^4$ of the center insert 41 may, for example include a radiused portion R (FIGS. 2A–2B) so that a tip of the electrode tip will have a radius surrounded by a straight chamfered portion formed by any of the straight cutting edge portions of the top and bottom chamfer inserts. Of course, the top and bottom chamfer inserts 43 and 45 and the center insert 41 may all be identical or may all be different. The top and bottom chamfer insert 43 and 45 and the center insert 41 may include plural straight and/or radiused portions depending upon the shape to which it is desired to dress the electrode tip. The cutting edge portions of any insert can be shaped according to the shape desired for the workpiece.

In the tool 21, the center insert 41 and the top (and bottom) chamfer inserts 43 (and 45) are rotated such that the front surfaces 41$x$ and 43$x$ are rake surfaces, and portions 41$c$ and 43$c$ of the top and bottom surfaces 41$t$ and 41$b$, and 43$t$ and 43$b$ clearance surfaces. More particularly, in a given insert, the clearance surfaces are disposed between the insert hole arrangement and the cutting edges portions of the inserts at the intersection of the top surface and the front surface and at the intersection of the bottom surface and the front surface. A length of the top intersection between the top surfaces 41$t$ and 43$t$ and the front surface 41$x$ and 43$x$ and a length of the bottom intersection between the bottom surfaces 41$b$ and 43$b$ and the front surfaces 41$x$ and 43$x$ can be longer than a distance between the clearance surfaces on the top and bottom surfaces of the insert.

It is presently believed to be desirable that the clearance surfaces 41$c$ and 43$c$ define an angle of greater than or equal to 7° to a plane perpendicular to an axis of a respective insert hole arrangement or a plane passing through forwardmost points of the front surface 41$x$ and 43$x$, here denominated the plane of the front or rake surface. More particularly, it is presently believed to be desirable that the clearance surfaces 41$c$ and 43$c$ define an angle of approximately 15° to a plane perpendicular to an axis of a respective insert hole arrangement. The clearance angle provided on a given insert may, of course, differ as appropriate for the particular application. The clearance surfaces may each define an acute angle with the rake surface, i.e., the front surfaces 41x and 43x. The front surfaces 41x and 43x can be substantially straight as shown in the Figures, however, a more complex geometry can be provided if desired, such as a chipformer geometry to assist in chip formation and removal.

Behind the cutting edge portions and below the clearance surfaces 41c and 43c, the inserts 41 and 43 (and 45) may also be provided on their top and bottom surfaces (41t, 43t, 41b, 43b) with raised abutment portions 41a and 43a that abut against the bottom surfaces of the pockets of the toolholder and can assist in chip removal and that can provide additional strength to the insert proximate the insert hole arrangements 410 and 430. The raised portions 41a and 43a may serve other purposes, as well, such as assisting in positioning the inserts 41, 43, and 45 in the pockets 31, 33, and 35 by mating with corresponding depressions (not shown) in the pockets, if provided.

Figure 6A:
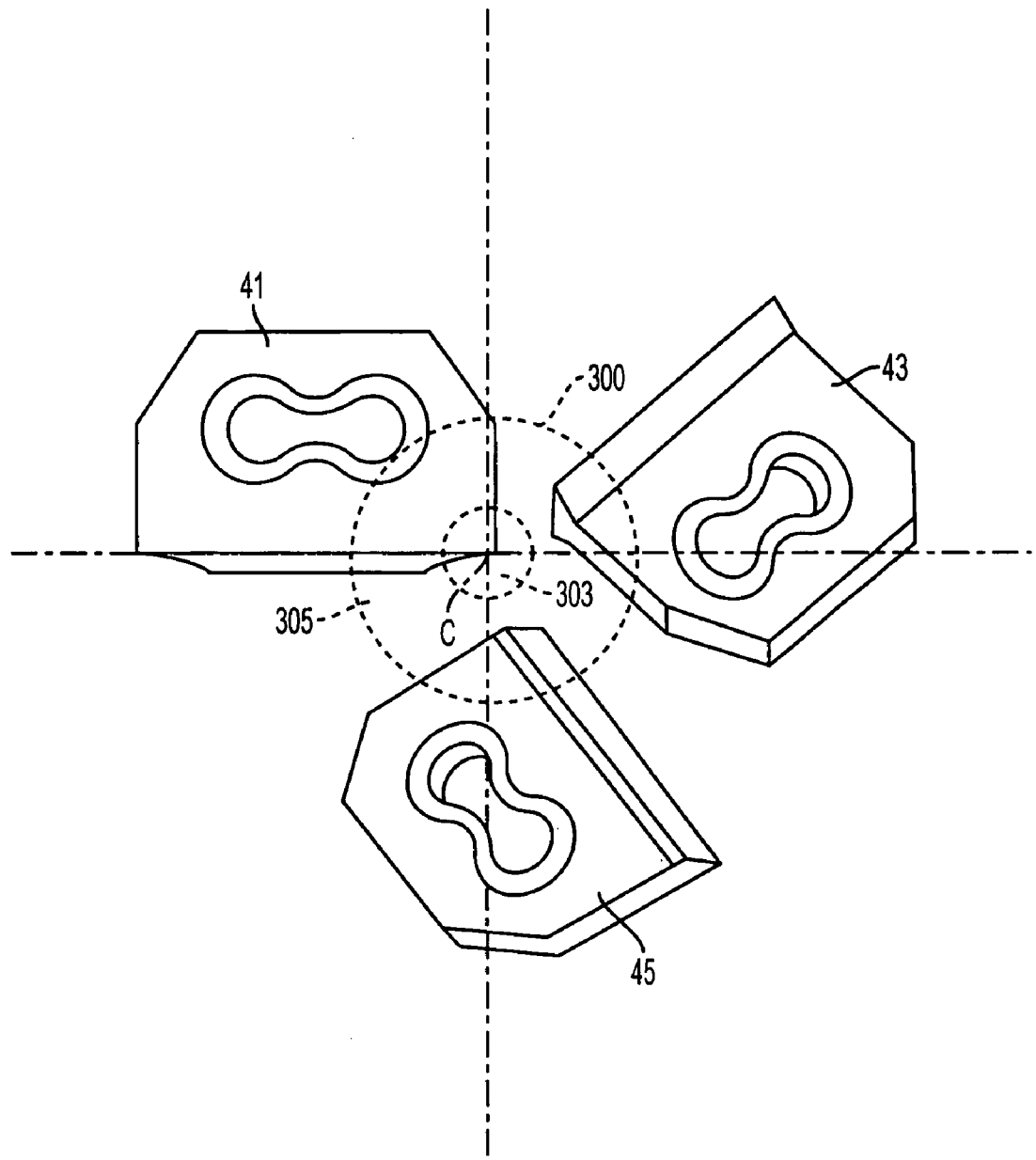
FIGS. 6A–6B are top and side views showing relative positions of inserts for use in a cutting tool according to an embodiment of the present invention
Figure 6B:
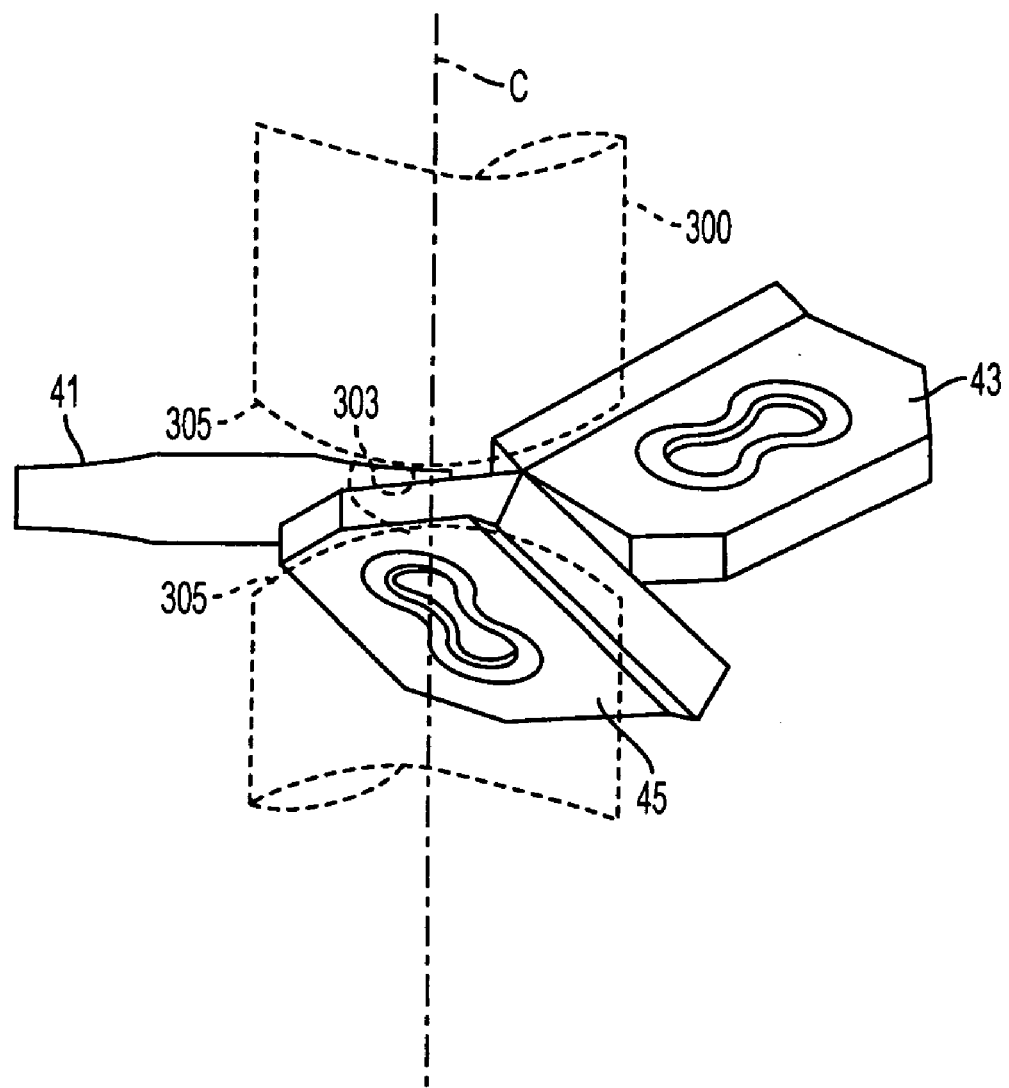

FIGS. 6A and 6B show the relative positions of the center insert 41, the top insert 43, and the bottom insert 45 with the toolholder 23 removed. The electrode tips 300 (shown in phantom) include a radiused portion 303 formed by radiused cutting edge portions of the center insert 41 and straight chamfered portions 305 formed by straight cutting edge portions of the top and bottom chamfer inserts 43 and 45. Of course, if inserts having shapes other than the radiused and straight cutting edge portions of the inserts 41, 43, and 45 are provided, other electrode tip shapes can be provided as desired.

As seen in FIG. 6A, the cutting edge portions of the cutting inserts define a "Y" shape around the central axis C. The "Y" shape can assist in balancing forces on the electrode tips compared to cutting tools that have inserts arranged substantially along a straight line, such as in U.S. Pat. No. 5,401,127. By improving the balance of forces on the electrode tips, it can be less necessary to provide support for the electrode tips and greater flexibility can be provided in terms of the forms of electrode tips that can be dressed.

Figure 8:
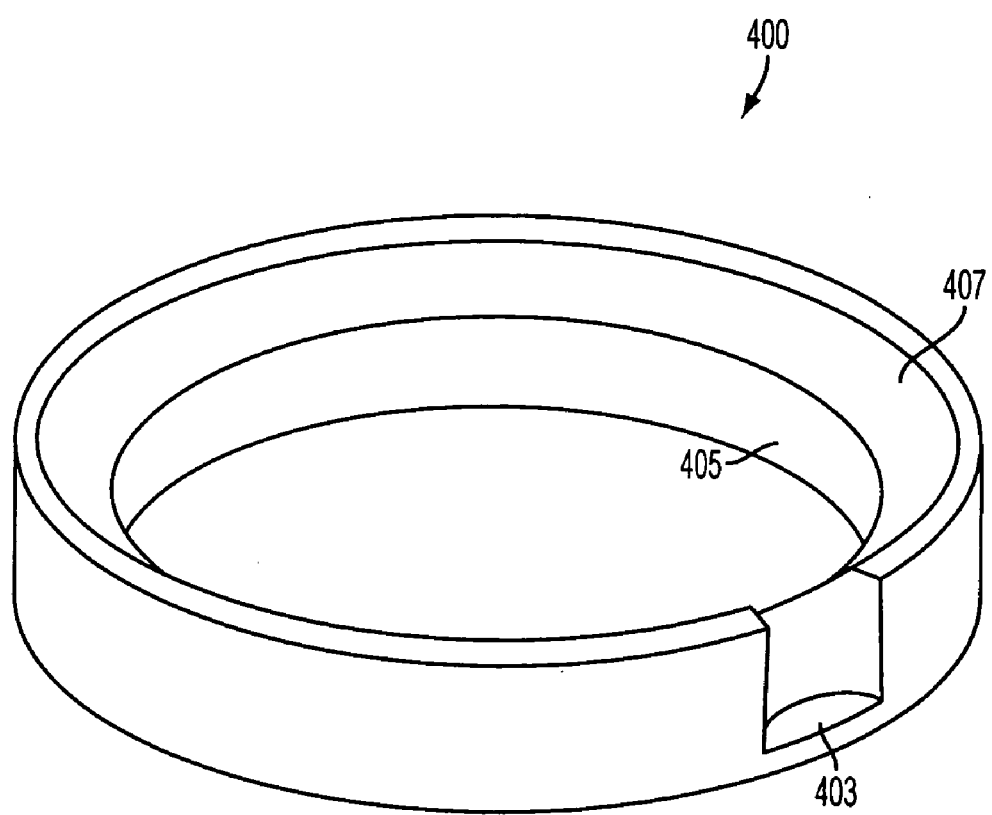
FIG. 8 is a perspective view of a guide plate according to an embodiment of the present invention.
Figure 9:
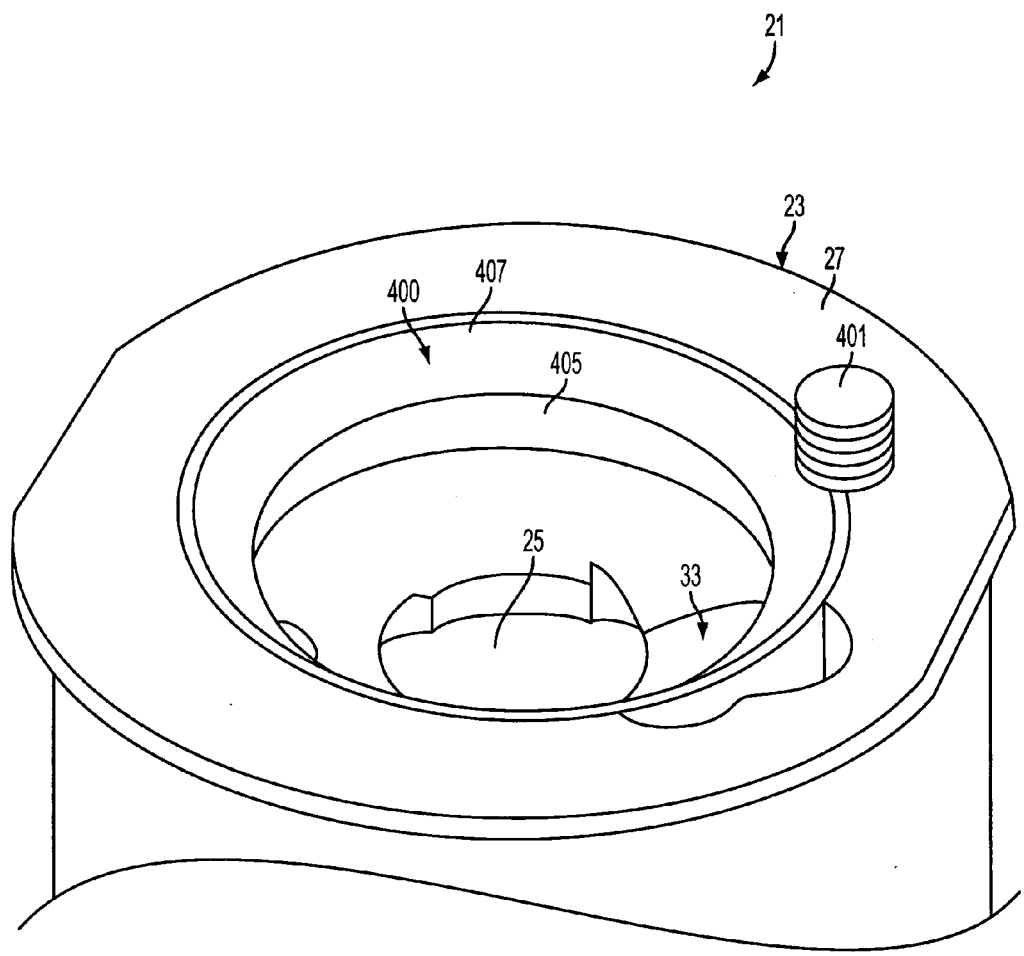
FIG. 9 is a perspective view of a cutting tool including a guide plate according to an embodiment of the present invention.

Regardless how well balanced the forces on the electrode tips are, it is often desirable to provide support for the electrode tips. FIG. 8 shows a guide ring 400 and FIG. 9 shows the guide ring installed in a cutting tool 21 and secured by a set screw 401 that mates with threads on the toolholder 23 (not shown) and contacts an abutment surface 403 on the guide ring to hold the guide ring in place relative to the toolholder. If desired, the threads on the guide ring can be omitted and the screw 401 can engage with threads on the toolholder and hold the guide ring. The guide ring 400 can be used to facilitate guiding an electrode tip to a desired position along or relative to the central axis C. For example, if axes of the electrode tips extend along or are parallel to but offset radially from the central axis C, a vertical surface 405 of the guide plate can provide support for the electrode tips. If an axis of the electrode tips is to be disposed at an angle to the central axis C, then an angled surface 407 of the guide ring 400 can provide support for the electrode tips. The guide ring can be provided with bearings (not shown) on its angled and/or vertical surfaces if desired.

Usually the machine for dressing the opposing tips of welding electrodes has no controlled feed speed. The top clearance surface 41t and the bottom clearance surface 41b of the center insert 41 will function as feed stop surfaces for the welding electrodes at too high feed speeds to safeguard against overfeeding.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An indexable insert, comprising an insert body including a plurality of cutting edge portions and an insert hole arrangement for permitting the insert to be secured to a toolholder, the insert hole arrangement including at least one securing screw-receiving hole, the insert hole arrangement being configured to permit a securing screw to extend through the insert body along any one of at least two different axes through the insert hole arrangement, wherein each hole of the at least one hole of the insert hole arrangement being non-circular and having at least two opposite ends and including at least two non-concentric, semi-circular screw abutment surfaces on the opposite ends thereof for abutting against the securing screw, each screw abutment surface being continuous.

2. The indexable insert as set forth in claim 1, where the insert hole arrangement is configured such that at least two of the at least two different axes are offset from an axis of symmetry of the insert body.

3. The indexable insert as set forth in claim 2, wherein the insert is symmetrical about a plane perpendicular to an axis of any one of at least two different axes through the insert hole arrangement.

4. The indexable insert as set forth in claim 3, where the insert is symmetrical about a plane parallel to an axis of any one of at least two different axes through the insert hole arrangement.

5. The indexable insert as set forth in claim 2, wherein the insert is symmetrical about a plane parallel to an axis of any one of at least two different axes through the insert hole arrangement.

6. The indexable insert as set forth in claim 1, wherein the insert is symmetrical about a plane perpendicular to an axis of any one of at least two different axes through the insert hole arrangement.

7. The indexable insert as set forth in claim 6, wherein the insert is symmetrical about a plane parallel to an axis of any one of at least two different axes through the insert hole arrangement.

8. The indexable insert as set forth in claim 1, wherein the insert is symmetrical about a plane parallel to an axis of any one of at least two different axes through the insert hole arrangement.

9. The indexable insert as set forth in claim 1, wherein the insert hole arrangement is configured to permit the insert to be secured to a toolholder in a plurality of different ways to permit use of each of the plurality of cutting edge portions.

10. The indexable insert as set forth in claim 1, wherein the insert hole arrangement is configured to permit the insert to be secured to a toolholder in four different ways to permit use of each of four cutting edge portions.

11. The indexable insert as set forth in claim 1, wherein the insert hole arrangement is configured to permit the insert to be secured to a toolholder in two different ways to permit use of each of four cutting edge portions.

12. The indexable insert as set forth in claim 1, wherein each of the plurality of cutting edge portions includes a straight portion.

13. The indexable insert as set forth in claim 1, wherein each of the plurality of cutting edge portions includes a radiused portion.

14. The indexable insert as set forth in claim 1, wherein the insert includes at least one clearance surface separating the cutting edges portions and the insert hole arrangement.

15. The indexable insert as set forth in claim 14, wherein the at least one clearance surface defines an angle of greater than or equal to 7° to a plan perpendicular to an axis of any one of at least two different axes through the insert hole arrangement.

16. The indexable insert as set forth in claim 15, wherein the at least one clearance surface defines an angle of approximately 15° to a plane perpendicular to an axis of any one of at least two different axes through the insert hole arrangement.

17. The indexable insert as set forth in claim 1, wherein the screw abutment surface includes at least a portion that is disposed at a non-zero angle relative to any one of at least two different axes through the insert hole arrangement.

18. A set of indexable inserts, comprising at least one first insert and at least one second insert usable together on a common toolholder, each of the first insert and the second insert including an insert body including a plurality of cutting edge portions and an insert hole arrangement for permitting the insert body to be secured to the toollholder, the insert hole arrangement including at least one securing screw-receiving hole, wherein, for each of the first insert and the second insert, the insert hole arrangement is configured to permit a securing screw to extend through the insert body along any one of at least two different axes through the insert hole arrangement, the cutting edge portions of the first insert being different from the cutting edge portions of the second insert.

19. The set of indexable inserts as set forth in claim 18, wherein the set includes one first insert and two second inserts usable together on a common toolholder.

20. The set of indexable inserts as set forth in claim 18, wherein each of the plurality of cutting edge portions of at least one of the first insert and the second insert includes a straight portion.

21. The set of indexable inserts as set forth in claim 18, wherein each of the plurality of cutting edge portions of at least one of the first insert and the second insert includes a radiused portion.

22. An indexable insert, comprising an insert body including a top surface including a top clearance surface, a bottom surface including a bottom clearance surface, and a side rake surface extending between the top surface and the bottom surface, a top intersection between the side rake surface and the top surface defining at least two top cutting edge portions and a bottom intersection between the side rake surface and the bottom surface defining at least two bottom cutting edge portions, wherein a length of the top intersection and a length of the bottom intersection are each greater than a distance between the top intersection and the bottom intersection, the side rake surface is substantially straight, and the top clearance surface and the bottom clearance surface each define an acute angle with the side rake surface.

23. The indexable insert as set forth in claim 22, wherein the top clearance surface and the bottom clearance surface each define an angle of less than or equal to 15° with a plane perpendicular to a plane of the rake surface.

24. The indexable insert as set forth in claim 22, wherein each of the plurality of top cutting edge portions and each of the plurality of bottom cutting edge portions includes a straight portion.

25. The indexable insert as set forth in claim 22, wherein each of the top surface and the bottom surface includes an abutment surface for abutting against a surface of a pocket of a toolholder.

26. An indexable insert, comprising an insert body including a top surface including a to clearance surface, a bottom surface including a bottom clearance surface, and a side rake surface extending between the top surface and the bottom surface, a top intersection between the side rake surface and the top surface defining at least two top cutting edge portions and a bottom intersection between the side rake surface and the bottom surface defining at least two bottom cutting edge portions, wherein a length of the top intersection and a length of the bottom intersection are each greater than a distance between the ton intersection and the bottom intersection, wherein the top clearance surface and the bottom clearance surface each define an angle of greater than or equal to 7° with a plane perpendicular to a plane of the rake surface.

27. The indexable insert as set forth in claim 26, wherein the top clearance surface and the bottom clearance surface each define an angle of less than or equal to 15° with a plane perpendicular to a plane of the rake surface.

28. An indexable insert, comprising an insert body including a top surface including a top clearance surface, a bottom surface including a bottom clearance surface, and a side rake surface extending between the ton surface and the bottom surface, a top intersection between the side rake surface and the top surface defining at least two top cutting edge portions and a bottom intersection between the side rake surface and the bottom surface defining at least two bottom cutting edge portions, wherein a length of the top intersection and a length of the bottom intersection are each greater than a distance between the top intersection and the bottom intersection, wherein each of the plurality of top cutting edge portions and each of the plurality of bottom cutting edge portions includes a curved portion defining a segment of a circle when viewed perpendicular to the rake surface.

* * * * *